US008243614B2

(12) United States Patent
Driscoll et al.

(10) Patent No.: US 8,243,614 B2
(45) Date of Patent: Aug. 14, 2012

(54) HARDWARE EFFICIENT MONITORING OF INPUT/OUTPUT SIGNALS

(75) Inventors: Kevin R. Driscoll, Maple Grove, MN (US); Brendan Hall, Eden Prairie, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 591 days.

(21) Appl. No.: 12/044,808

(22) Filed: Mar. 7, 2008

(65) Prior Publication Data
US 2009/0225673 A1    Sep. 10, 2009

(51) Int. Cl.
*G01R 31/08* (2006.01)
(52) U.S. Cl. ......................................... 370/252; 370/419
(58) Field of Classification Search .................. 370/252
See application file for complete search history.

(56) References Cited

U.S. PATENT DOCUMENTS

| 4,849,657 A | 7/1989 | Boisvert |
| 4,849,979 A | 7/1989 | Maccianti et al. |
| 5,157,780 A | 10/1992 | Stewart et al. |
| 5,276,823 A | 1/1994 | Cutts, Jr. et al. |
| 5,648,972 A | 7/1997 | Gharakhanaian |
| 5,787,114 A | 7/1998 | Rammamurthy et al. |
| 5,923,512 A | 7/1999 | Brownlow et al. |
| 5,956,370 A | 9/1999 | Ducaroir et al. |
| 6,161,202 A | 12/2000 | Kuntzsch et al. |
| 6,301,633 B1 | 10/2001 | Chapman |
| 7,020,076 B1 | 3/2006 | Alkalai et al. |
| 7,182,296 B2 | 2/2007 | Yount et al. |
| 7,263,593 B2* | 8/2007 | Honda et al. .................. 711/205 |
| 2006/0190642 A1 | 8/2006 | Aldereguia et al. |
| 2006/0221368 A1* | 10/2006 | Higuchi ....................... 358/1.13 |
| 2008/0080490 A1* | 4/2008 | Ito ................................. 370/362 |

FOREIGN PATENT DOCUMENTS

| EP | 1180877 | 2/2002 |
| EP | 1338974 | 8/2003 |

OTHER PUBLICATIONS

European Patent Office, "European Search Report", Jun. 22, 2009, Published in: EP.

* cited by examiner

*Primary Examiner* — Derrick Ferris
*Assistant Examiner* — Matthew Hopkins
(74) *Attorney, Agent, or Firm* — Fogg & Powers LLC

(57) ABSTRACT

A communication device comprises first and second circuits to implement a plurality of ports via which the communicative device is operable to communicate over a plurality of communication channels. For each of the plurality of ports, the communication device comprises: command hardware that includes a first transmitter to transmit data over a respective one of the plurality of channels and a first receiver to receive data from the respective one of the plurality of channels; and monitor hardware that includes a second receiver coupled to the first transmitter and a third receiver coupled to the respective one of the plurality of channels. The first circuit comprises the command hardware for a first subset of the plurality of ports. The second circuit comprises the monitor hardware for the first subset of the plurality of ports and the command hardware for a second subset of the plurality of ports.

17 Claims, 4 Drawing Sheets

HARDWARE EFFICIENT MONITORING OF INPUT/OUTPUT SIGNALS

GOVERNMENT INTEREST STATEMENT

The U.S. Government may have certain rights in the present invention as provided for by the terms of contracts NNJ06TA25C (Prime) and RH6-118204 (sub-contract) awarded by NASA/Lockheed Martin Company.

BACKGROUND

In one type of fault tolerant system, for each port, one set of hardware, called the command hardware or "COM", transmits and receives signals and another independent set of hardware, called the monitor hardware or "MON", monitors the signals transmitted and received by the command hardware. For example, in one such system, a wrap-back mechanism couples the transmitter of the COM hardware to a receiver in the MON hardware. Also, in such a system, for each port, each received signal is delivered to two independent receivers: one in the monitor hardware and one in the command hardware. Thus, for each port, such systems require three receivers and one transmitter: one transmitter and one receiver in the command hardware and two receivers in the monitor hardware.

In some applications, it is especially desirable to implement the physical layer of such a COM/MON system using similar hardware for both the command hardware and the monitor hardware such that they use the same number of transmitters and receivers. However, doing so typically leads to waste. FIG. 1 illustrates the physical layer portion of a COM/MON system that is implemented using the similar hardware for both the command and monitor hardware. In the example shown in FIG. 1, a device 100 comprises two ports 105. The device 100 is implemented using two transceiver circuits, one of which (also referred to here as the "COM IC" 104) is used to implement the command hardware for each port 105 and the other of which (also referred to here as the "MON IC" 106) is used to implement the monitor hardware for each port 105. Each of the circuits 104 and 106 includes four transceivers 108, each of which includes a respective transmitter 110 and a respective receiver 112.

The one transmitter and one receiver needed to implement the COM portion for each port 105 are implemented using a single one of the transceivers 108 in the COM IC 104. The transmitter 110 and receiver 112 used to implement the COM portion for each port 105 are coupled to the transmit portion 114 and receive portion 116 portion, respectively, of the communication channel 118 to which that port 105 is coupled.

The two receivers needed to implement the MON portion for each port 105 are implemented using the receivers 112 of two of the transceivers 108 included in the MON IC 106. One of the receivers 112 is coupled to the transmitter 110 for the respective COM portion for that port 105 using a wrap-back link 120, and the other receiver 112 is coupled to the receive portion 116 of the communication channel 118 in order to receive data from the communication channel 118.

The design shown in FIG. 1 uses similar hardware to implement the physical layer for each of the COM and MON portions for each port 105. However, as shown in FIG. 1, for each port 105 of the device 100, one entire transceiver 108 in the COM IC 104 and two transmitters 110 in the MON IC 106 are wasted (where the wasted elements are marked with an "X").

SUMMARY

In one embodiment, a communication device is provided. The communication device comprises first and second circuits to implement a plurality of ports via which the communicative device is operable to communicate over a plurality of communication channels. For each of the plurality of ports, the communication device comprises: command hardware that includes a first transmitter to transmit data over a respective one of the plurality of channels and a first receiver to receive data from the respective one of the plurality of channels; and monitor hardware that includes a second receiver coupled to the first transmitter and a third receiver coupled to the respective one of the plurality of channels. The first circuit comprises the command hardware for a first subset of the plurality of ports. The second circuit comprises the monitor hardware for the first subset of the plurality of ports and the command hardware for a second subset of the plurality of ports.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 2:
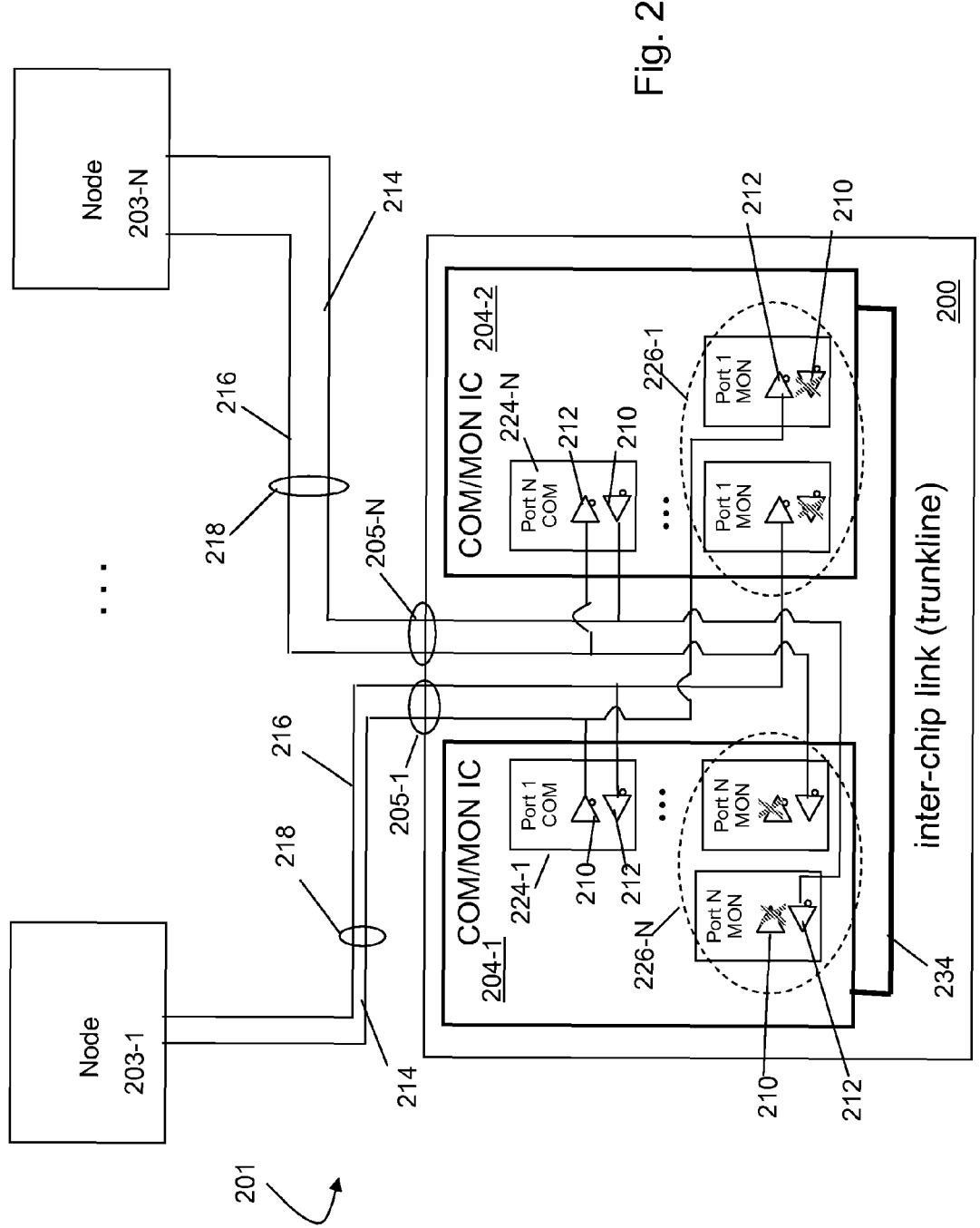
FIG. 2 is a block diagram of a network comprising a fault-tolerant device according to embodiments of the present invention.

FIG. 2 is a block diagram of one embodiment of a network 201 that comprises a fault-tolerant networking communication device 200. In the particular embodiment shown in FIG. 2, the device 200 is implemented as a networking device 200 that interconnects a plurality of nodes 203 (individually labeled as 203-1, . . . , 203-N in FIG. 2). In the embodiment shown in FIG. 2, the networking device 200 comprises at least one port 205 for each node 203 that couples the node 203 to the networking device 200 via a respective communication channel 218. The ports 205 are individually labeled as 205-1, . . . , 205-N in FIG. 2. In some implementations of such an embodiment, the networking device 200 is implemented as an Open Systems Interconnection (OSI) International Standards Organization (ISO) layer-1/layer-2 networking device (such as a hub or repeater) in which any data validly received on one port 205 of the networking device 200 is broadcast on the other ports of the networking device 200. In other implementations of such an embodiment, the networking device is implemented as an OSI ISO layer 3 networking device such as a bridge, switch, or router, in which any data validly received on one port of the networking device 200 is re-transmitted on one or more of the other ports of the networking device 200. In other embodiments, the networking device 200 implements various mixes of protocol layering and functionality, and can include functionality not conforming to standard communication models.

In one exemplary implementation of the embodiment shown in FIG. 2, the network 201 comprises a local area network used in or with a satellite or other vehicle (such as an automobile, aircraft, and/or space craft), where the nodes 203-1 . . . 203-N are implemented as sensors, processing units, memory devices, etc. associated with the operation of such a vehicle. Other embodiments are implemented in other ways and for other applications.

Figure 1:
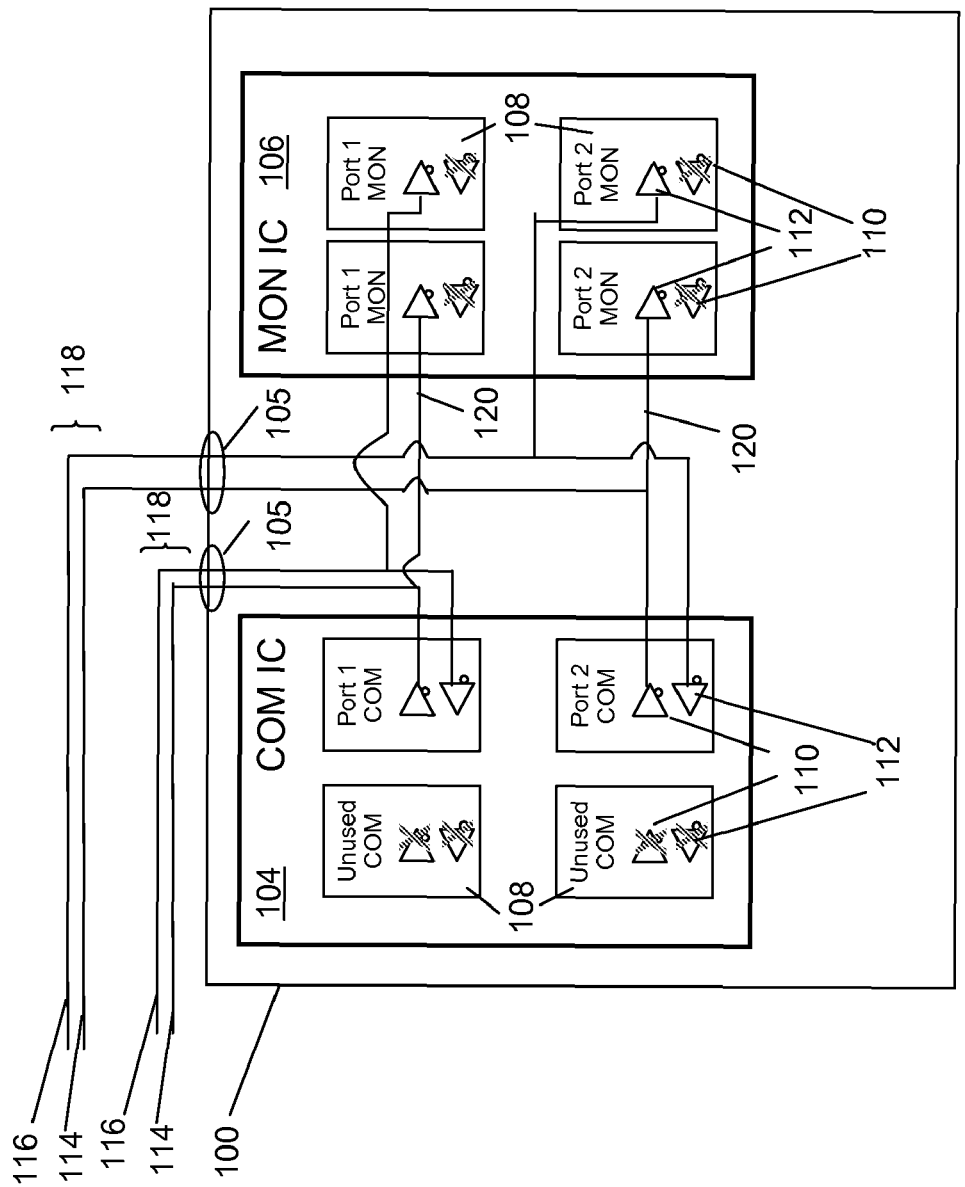
FIG. 1 is a block diagram of a conventional fault tolerant device.

Device 200 includes circuit 204-1 and circuit 204-2. For each of port 205, device 200 includes a respective command module 224 (also referred to herein as "COM" or "command" hardware and individually labeled 224-1, . . . , 224-N) and a monitor module 226 (also referred to herein as "MON" or "monitor" hardware and individually labeled 226-1, . . . , 226-N). Each command module 224 comprises a transceiver having a transmitter 210 and a receiver 212. Each monitor module 226 comprises two transceivers, each of which including a respective transmitter 210 and a receiver 212. Unlike the device 100 shown in FIG. 1, both command modules 224 and monitor modules 226 are located in each of circuits 204-1 and 204-2. In particular, for each port 205, the respective command module 224 is located in one of the circuits 204-1 or 204-2 while the corresponding monitor module 226 is located in the other circuit 204-2 or 204-1. In other words, for each port 205 with a command module 224 located in circuit 204-1, that command module 224 is monitored by a corresponding monitor module 226 in circuit 204-2. Similarly, for each port 205 with a command module 224 located in circuit 204-2, that command module 224 is monitored by a corresponding monitor module 226 in circuit 204-1.

For each port 205, the transmitter 210 in that port's command module 224 is coupled to the transmit portion 214 of the communication channel 218 to which that port 205 is coupled. Similarly, for each port 205, the receiver 212 in that port's command module 224 is coupled to the receive portion 216 of the communication channel 218 to which that port 205 is coupled. Each port's monitor module 226 has two receivers 212: one coupled to the transmitter 210 of the corresponding command module 224 and another coupled to the receive portion 216 of the communication channel 218 to which that port is coupled.

Each communication channel is implemented using a suitable communication medium or media (for example, metallic communication media such as twisted pair cables, coaxial cable and optical communication media such as fiber optic cables). In some embodiments, each communication channel also uses suitably partitioned (for example, via code, frequency, space, or time multiplexing) radio frequency (RF) or free-space optical paths. The transmit portion 214 of each communication channel 218 is the communication medium or media over which data is transmitted. Likewise, the receive portion 216 of each communication channel 218 is the communication medium or media from which data is received. In some embodiments, the transmit portion 214 and the receive portion 216 of the communication channel 218 is implemented using a separate communication medium or media. For example, in one embodiment where the communication channel 218 is implemented using a copper twisted-pair cable such as a category 5 ("CAT 5") cable, one pair of copper wires included in the CAT5 cable is used for transmitting data and another pair of copper wires included in the CAT5 cable is used for receiving data. In such an embodiment, the former pair of copper wires comprises the transmit portion 214 of the communication channel 218, and the latter pair of copper wires comprises the receive portion 216 of the communication channel 218. In another embodiment where the communication channel 218 is implemented using fiber optic cables, one optical cable is used to transmit data for that communication channel 218 and another optical cable is used to receive data from that communication channel 218. In such an embodiment, the first optical fiber comprises the transmit portion 214 of the communication channel 218 and the second optical fiber comprises the receive portion 216 of the communication channel 218. In other embodiments, the transmit portion 214 and the receive portion 216 of the communication channel 218 are implemented using the same communication medium or media, for example, by using a multiplexing technique such as time division multiplexing, frequency division multiplexing, wave division multiplexing, or code division multiplexing. In some embodiments, each transmit portion and each receive portion of a communication channel uses multiple segments of media in parallel.

In some embodiments, it is necessary for the circuit 204-1 to communicate with circuit 204-2. For example, communication between circuits 204-1 and 204-2 is necessary in some embodiments to transfer data received on port 205-1 by circuit 204-1 to circuit 204-2 for transmitting on port 205-N. Exemplary situations in which communication between circuits 204 is necessary or desired include embodiments comprising three or more circuits 204 or embodiments wherein each transmitter can have only one receiver (such as for quantum cryptography ports 205 with the quantum devices embedded in each circuit 204). In such embodiments, an inter-chip link 234 is used to facilitate the necessary communication between circuits 204-1 and 204-2. However, it is to be understood that inter-chip link 234 is not necessary in some embodiments since each of circuits 204-1 and 204-2 receive a copy of all inputs on ports 205-1 . . . 205-N. In addition, in embodiments utilizing inter-chip link 234, a circuit having a monitor module 226 is precluded from providing information via the inter-chip link 234 which influences the output of the command module 224 being monitored. Similarly, a circuit having a command module 224 is precluded from providing information via the inter-chip link 234 which adversely impacts the ability of the corresponding monitor module 226 to monitor the command module 224.

Figure 3:
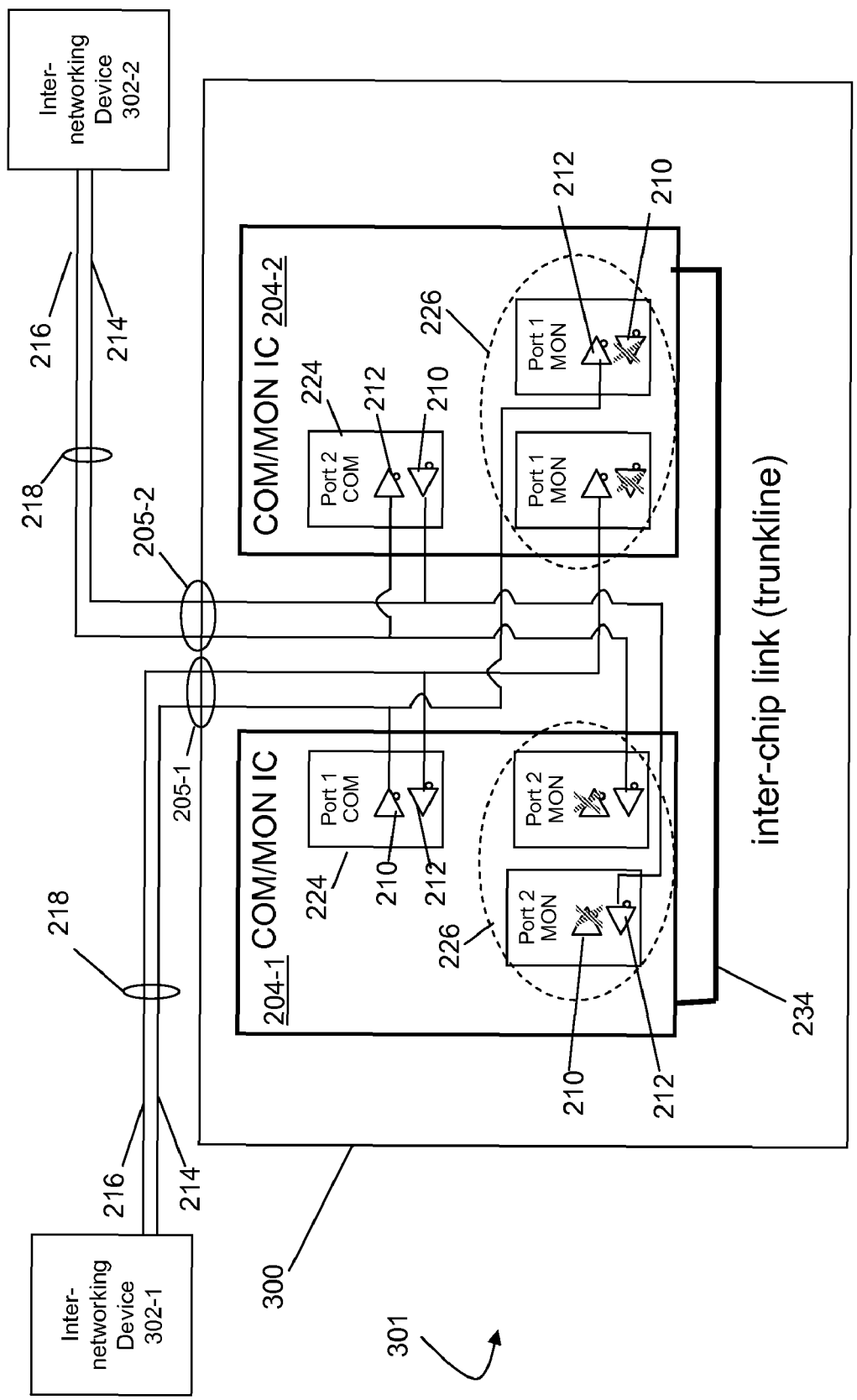
FIG. 3 is a block diagram of another network comprising a fault tolerant device according to embodiments of the present invention.

Although an embodiment is shown in FIG. 2 in which the COM/MON techniques described here are used to implement a networking device, it is to be understood that such techniques can be used in other embodiments. For example, the COM/MON techniques described here can be used to implement terminal nodes. One example of such an embodiment is shown in FIG. 3. In the embodiment shown in FIG. 3, substantially the same COM/MON functionality described above in connection with the embodiment shown in FIG. 2 is used to implement the COM/MON functionality of terminal node 300 (and the same reference numerals are used in FIG. 3 as in FIG. 2 to refer to substantially similar functionality, the description of which is not repeated here for clarity). The terminal node 300 typically will have fewer ports 205. In the particular embodiment shown in FIG. 3, the terminal node 300 comprises two ports 205, each of which is coupled to a different networking device 302 via a respective communication channel 218.

By placing both command modules 224 and monitor modules 226 in both circuits 204-1 and 204-2, embodiments of the devices 200 and 300 reduce waste typically associated with conventional devices, such as device 100. In particular, the embodiments described in FIGS. 2 and 3 reduce the waste of a transceiver for each port. This reduction in waste enables lower production costs and/or the ability to provide support for more ports than a conventional device of similar size. The additional ports are a product of being able to use the transmitters and receivers wasted in conventional devices to provide additional ports. In addition, as shown in FIGS. 2 and 3, circuits 204-2 and 204-1 share identical designs, in some embodiments, which further reduces development and/or logistics costs.

Furthermore, although embodiments are shown in FIGS. 2 and 3 in which the COM/MON techniques described here are used in devices implemented with two circuits 204-1 and 204-2, it is to be understood that such techniques can be used in other embodiments. For example, the COM/MON techniques described here can be used to implement devices having more than two circuits 204-1 and 204-2. In the embodiment shown in FIG. 4, substantially the same COM/MON functionality described above in connection with the embodiment shown in FIG. 2 is used to implement the COM/MON functionality of device 400 (and the same reference numerals are used in FIG. 4 as in FIG. 2 to refer to substantially similar functionality, the description of which is not repeated here for clarity). However, device 400 includes three COM/MON circuits 204-1, 204-2, and 204-3.

Figure 4:
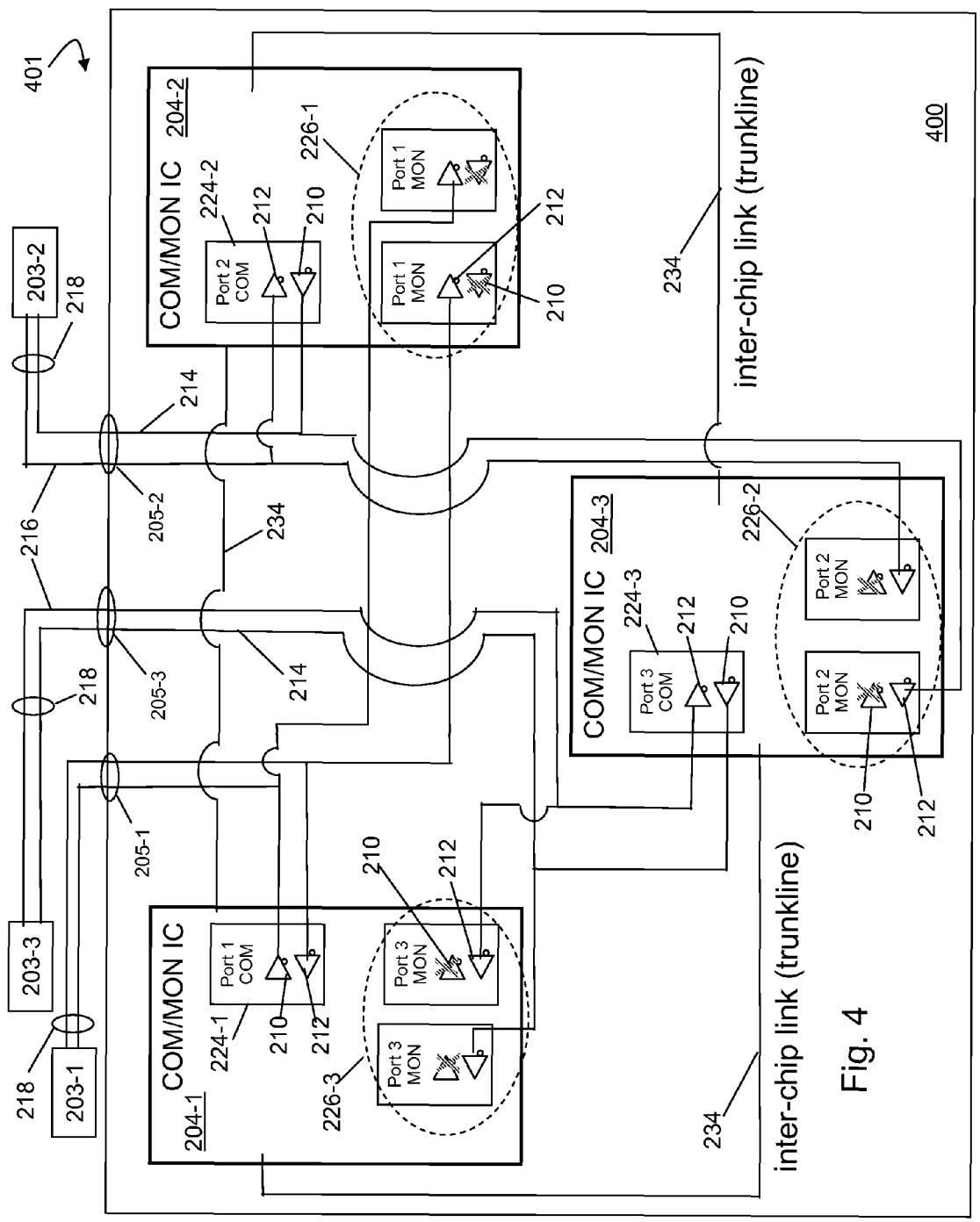
FIG. 4 is a block diagram of another network comprising a fault tolerant device according to embodiments of the present invention.

Circuits 204-1 . . . 204-3 monitor one another as described above. In particular, as shown in FIG. 4, command module 224-1 in circuit 204-1 is monitored by monitor module 226-1 in circuit 204-2. Similarly, command module 224-2 in circuit 204-2 is monitored by monitor module 226-2 in circuit 204-3. Finally, command module 224-3 in circuit 204-3 is monitored by monitor module 226-3 in circuit 204-1. In addition, circuit 204-1 is coupled to circuit 204-3 via an inter-chip link 234 in order to facilitate communication between circuits 204-1 and 204-3 when necessary, e.g. to transfer data from port 205-2 to port 205-1, circuit 204-3 sends the data from port 205-2 to circuit 204-1 so that its command module 224-1 can transmit the data to port 205-1.

Similarly, circuit 204-3 is coupled to circuit 204-2 and circuit 204-1 is coupled to circuit 204-2 via an inter-chip link 234 to facilitate communication between circuits 204-1, 204-2 and 204-3. Thus, by coupling chips 204-1 . . . 204-3 in a ring-like manner as shown in FIG. 4, circuits 204-1 . . . 204-3 are able to monitor and communicate with one another. Notably, although only three circuits are shown in FIG. 4, it is to be understood that the pattern of coupling circuits 204-1 . . . 204-3 to monitor one another can be extended to include four or more circuits, each circuit monitoring another. In addition, although the embodiment shown in FIG. 4 is described in terms of a ring, it is to be understood that other embodiments may use other logical topologies in which each COM module 224 still has an associated MON module 226 in an independent circuit and each independent circuit contains a mix of COM and MON modules.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs), field programmable gate arrays (FPGAs), or other circuitry.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A communication device comprising:
first and second circuits to implement a plurality of ports via which the communicative device is operable to communicate over a plurality of communication channels;
wherein, for each of the plurality of ports, the communication device comprises:
command hardware that includes a first transmitter to transmit data over a respective one of the plurality of channels and a first receiver to receive data from the respective one of the plurality of channels; and
monitor hardware that includes a second receiver coupled to the first transmitter to receive data from the first transmitter and a third receiver coupled to the respective one of the plurality of channels, wherein the third receiver receives data from the respective one of the plurality of channels;
wherein the first circuit comprises the command hardware for a first subset of the plurality of ports; and
wherein the second circuit comprises the monitor hardware for the first subset of the plurality of ports and the command hardware for a second subset of the plurality of ports.

2. The communication device of claim 1, wherein the first circuit further comprises the monitor hardware for the second subset of the plurality of ports.

3. The communication device of claim 1, wherein the first circuit and the second circuit are substantially identical.

4. The communication device of claim 1, further comprising an inter-chip link coupled to the first and second circuits and configured to enable communication between the first and second circuits.

5. The communication device of claim 1, wherein the communication device comprises a networking device.

6. The communication device of claim 1, wherein the communication device further comprises a third circuit, wherein the third circuit comprises the command hardware for a third subset of the plurality of ports and the monitor hardware for the second subset of the plurality of ports.

7. A system comprising:
a plurality of nodes; and
at least one networking device communicatively coupling the plurality of nodes to one another;
wherein the networking device comprises a plurality of ports to communicatively couple the networking device to a plurality of communication channels, wherein each of the plurality of nodes is communicatively coupled to the networking device via at least one of the plurality of ports;

wherein the networking device further comprises first and second circuits;

wherein, for each of the plurality of ports, the networking device comprises:

command hardware that includes a first transmitter to transmit data over a respective one of the plurality of channels and a first receiver to receive data from the respective one of the plurality of channels;

monitor hardware that includes a second receiver coupled to the first transmitter to receive data from the first transmitter and a third receiver coupled to the respective one of the plurality of channels, wherein the third receiver receives data from the respective one of the plurality of channels;

wherein the first circuit comprises the command hardware for a first subset of the plurality of ports; and wherein the second circuit comprises the monitor hardware for the first subset of the plurality of ports and the command hardware for a second subset of the plurality of ports.

8. The system of claim 7, wherein the first circuit further comprises the monitor hardware for the second subset of the plurality of ports.

9. The system of claim 7, wherein the first circuit and the second circuit are substantially identical.

10. The system of claim 7, further comprising an inter-chip link coupled to the first and second circuits and configured to enable communication between the first and second circuits.

11. The system of claim 7, wherein the networking device further comprises a third circuit wherein the third circuit comprises the command hardware for a third subset of the plurality of ports and the monitor hardware for the second subset of the plurality of ports.

12. The system of claim 7, wherein the networking device is communicatively coupled to the plurality of nodes via one of twisted pair cable, coaxial cable, and fiber optic cable.

13. A communication device comprising:

a plurality of ports to communicatively couple the communication device to a plurality of communication channels;

a plurality of command modules to transmit and receive data on the plurality of communication channels, wherein each of the plurality of command modules comprises a first transmitter to transmit data over a respective one of the plurality of channels and a first receiver to receive data from the respective one of the plurality of channels;

a plurality of monitor modules to monitor data transmitted by the command modules and data received on the plurality of communication channels, wherein each of the plurality of monitor modules comprises a second receiver coupled to the first transmitter to receive data from the first transmitter and a third receiver coupled to the respective one of the plurality of channels, wherein the third receiver receives data from the respective one of the plurality of channels;

wherein there is at least one command module and at least one monitor module for each of the plurality of ports; and wherein at least one of the command modules for a first subset of the plurality of ports are implemented in the same circuit as at least one of the monitor modules for a second subset of the plurality of ports.

14. The communication device of claim 13, wherein each monitor module is implemented in a different circuit than the command module being monitored by that monitor module.

15. The communication device of claim 13, wherein the plurality of command modules and the plurality of monitor modules are implemented in two or more circuits, wherein each of the two or more circuits comprises at least one of the plurality of command modules and at least one of the plurality of monitor modules.

16. The communication device of claim 15, wherein two or more circuits are substantially identical circuits.

17. The communication device of claim 15, further comprising an inter-chip link coupled to the two or more circuits and configured to enable communication between the two or more circuits.

* * * * *